United States Patent

Buchanan, Jr. et al.

[11] Patent Number: 6,144,906
[45] Date of Patent: Nov. 7, 2000

[54] ADAPTIVE PULSE CONTROL

[75] Inventors: Harry C. Buchanan, Jr., Dayton; Richard L. Ponziani, Centerville; Joseph P. Whinnery, Columbus, all of Ohio

[73] Assignee: Valeo Electrical Systems, Inc., Auburn Hills, Mich.

[21] Appl. No.: 09/370,389

[22] Filed: Aug. 6, 1999

Related U.S. Application Data

[60] Provisional application No. 60/095,553, Aug. 6, 1998.

[51] Int. Cl.⁷ .................. G06F 19/00; B60S 1/08
[52] U.S. Cl. ................ 701/36; 307/9.1; 318/444; 318/445; 318/484
[58] Field of Search .................. 701/35, 36; 307/9.1, 307/10.1; 318/443, 444, 445, 446, 447, 484

[56] References Cited

U.S. PATENT DOCUMENTS

| | | |
|---|---|---|
| Re. 33,308 | 8/1990 | Millerd et al. . |
| 4,010,383 | 3/1977 | Grassmann . |
| 4,091,317 | 5/1978 | Roszyk et al. . |
| 4,158,159 | 6/1979 | Orris et al. . |
| 4,317,073 | 2/1982 | Blaszkowski . |
| 4,320,329 | 3/1982 | Gille et al. . |
| 4,388,574 | 6/1983 | Bois et al. . |
| 4,527,105 | 7/1985 | Shiraishi . |
| 4,544,870 | 10/1985 | Kearns et al. . |
| 4,625,157 | 11/1986 | Phillimore . |
| 4,663,575 | 5/1987 | Juzswik et al. . |
| 4,710,878 | 12/1987 | Iyoda . |
| 4,733,142 | 3/1988 | Bicknell . |
| 4,827,198 | 5/1989 | Mueller et al. . |
| 4,859,867 | 8/1989 | Larson et al. . |
| 4,866,357 | 9/1989 | Miller et al. . |
| 4,916,374 | 4/1990 | Schierbeek et al. . |
| 4,942,349 | 7/1990 | Millerd et al. . |
| 4,947,092 | 8/1990 | Nabha et al. . |
| 5,059,877 | 10/1991 | Teder . |
| 5,117,168 | 5/1992 | Nomura et al. . |
| 5,119,002 | 6/1992 | Kato et al. . |
| 5,140,233 | 8/1992 | Wallrafen . |
| 5,140,234 | 8/1992 | Wallrafen . |
| 5,166,587 | 11/1992 | Smart . |
| 5,216,341 | 6/1993 | Nomura et al. . |
| 5,235,260 | 8/1993 | Furukoshi . |
| 5,239,244 | 8/1993 | Teder . |
| 5,241,248 | 8/1993 | Furukoshi . |
| 5,245,259 | 9/1993 | Nakamura et al. . |
| 5,256,950 | 10/1993 | Matsumoto et al. . |
| 5,276,388 | 1/1994 | Levers . |
| 5,285,138 | 2/1994 | Okada . |
| 5,306,992 | 4/1994 | Droge . |
| 5,336,980 | 8/1994 | Levers . |
| 5,404,085 | 4/1995 | Resch et al. . |
| 5,412,296 | 5/1995 | Chien et al. . |
| 5,453,676 | 9/1995 | Agrotis et al. . |
| 5,493,190 | 2/1996 | Mueller . |
| 5,508,595 | 4/1996 | Schaefer . |
| 5,525,879 | 6/1996 | Wainwright . |

FOREIGN PATENT DOCUMENTS

| | | |
|---|---|---|
| 0 271 745 | 4/1992 | European Pat. Off. . |
| 0 547 337 | 3/1996 | European Pat. Off. . |

*Primary Examiner*—William A. Cuchlinski, Jr.
*Assistant Examiner*—Yonel Beaulieu
*Attorney, Agent, or Firm*—Jacox, Meckstroth & Jenkins

[57] ABSTRACT

An intelligent wiper system and method for wiping a windshield is disclosed having a microprocessor which controls the operation of a motor and which is capable of setting a baseline delay time using one or more wipe times, with the baseline delay time generally corresponding to a time interval between consecutive wipes of at least one wiper blade. The system and method automatically adjusts the baseline delay time in response to the second wipe time if the second wipe time is not substantially the same as a function of the first wipe time, wherein the function includes a predetermined constant which is at least one hundred percent of a first wipe time. An upper baseline wipe time threshold and a lower baseline wipe time threshold may be established such that the delay time is not adjusted if a current wipe time falls between such thresholds.

27 Claims, 7 Drawing Sheets

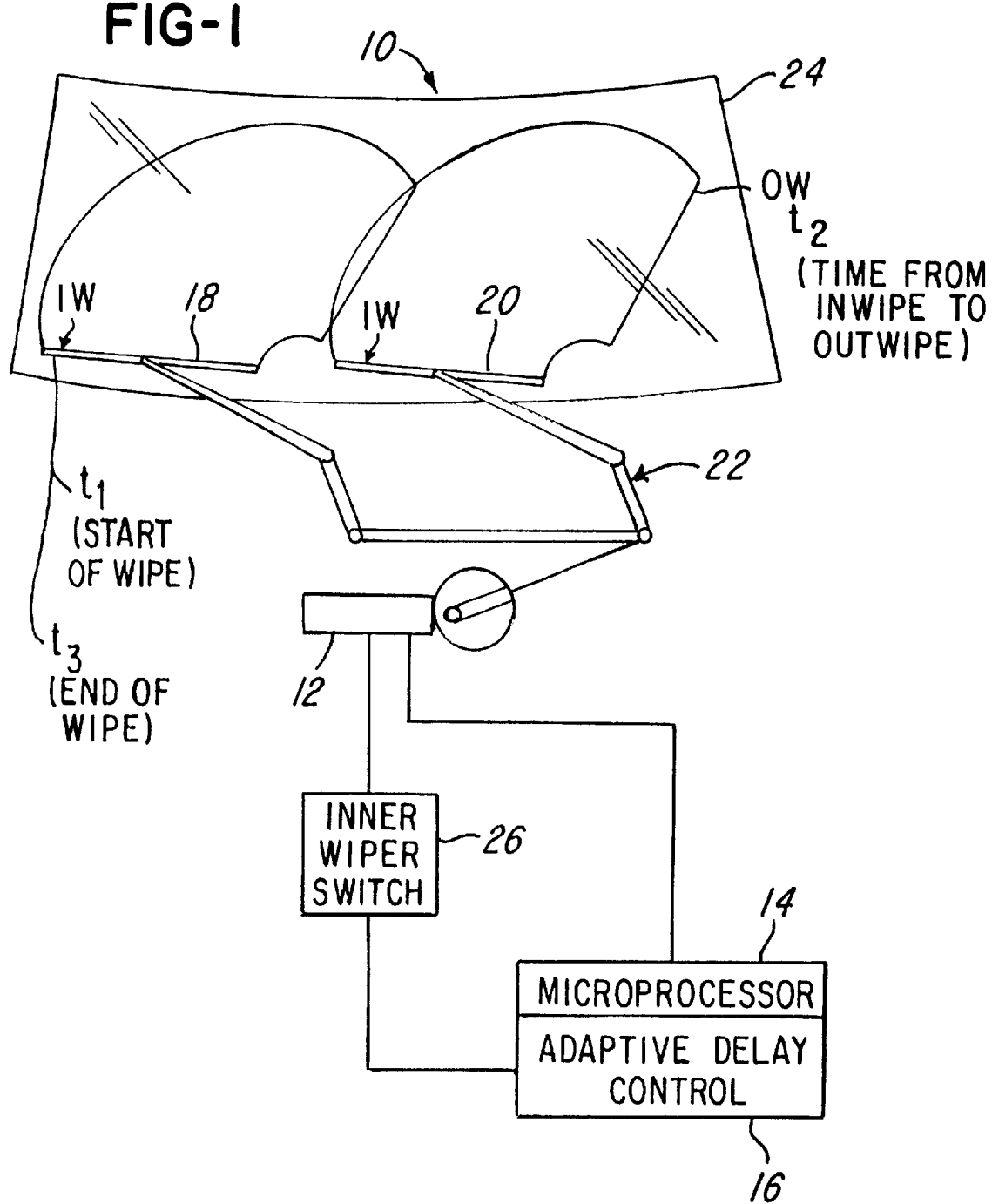

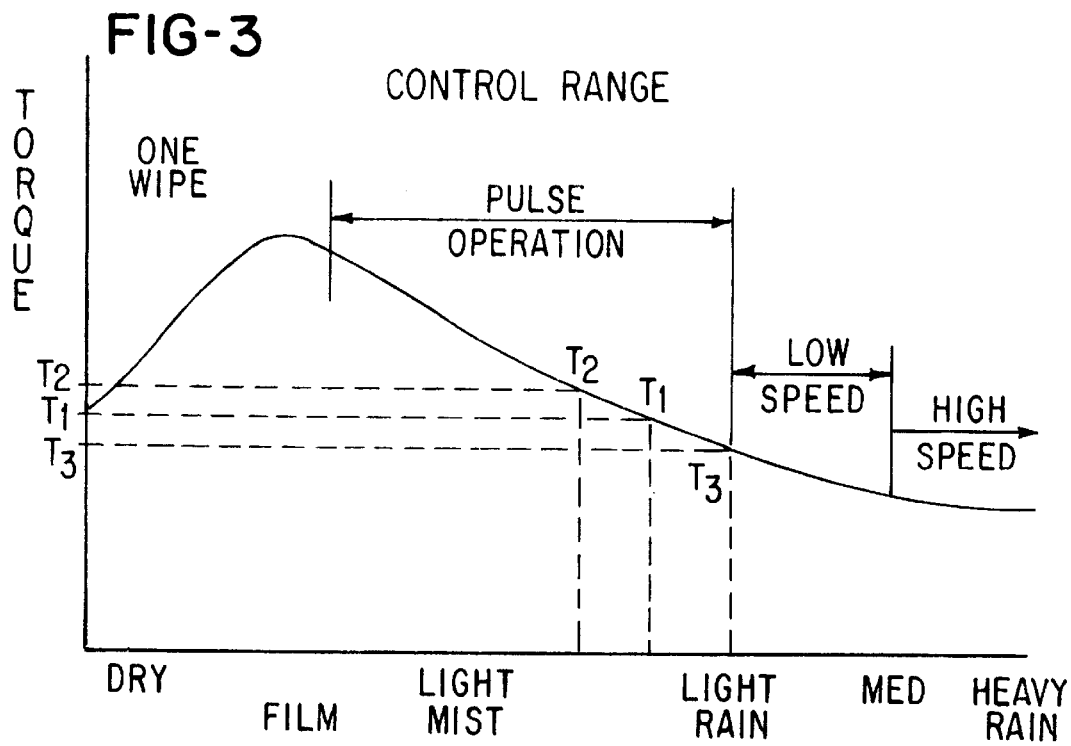
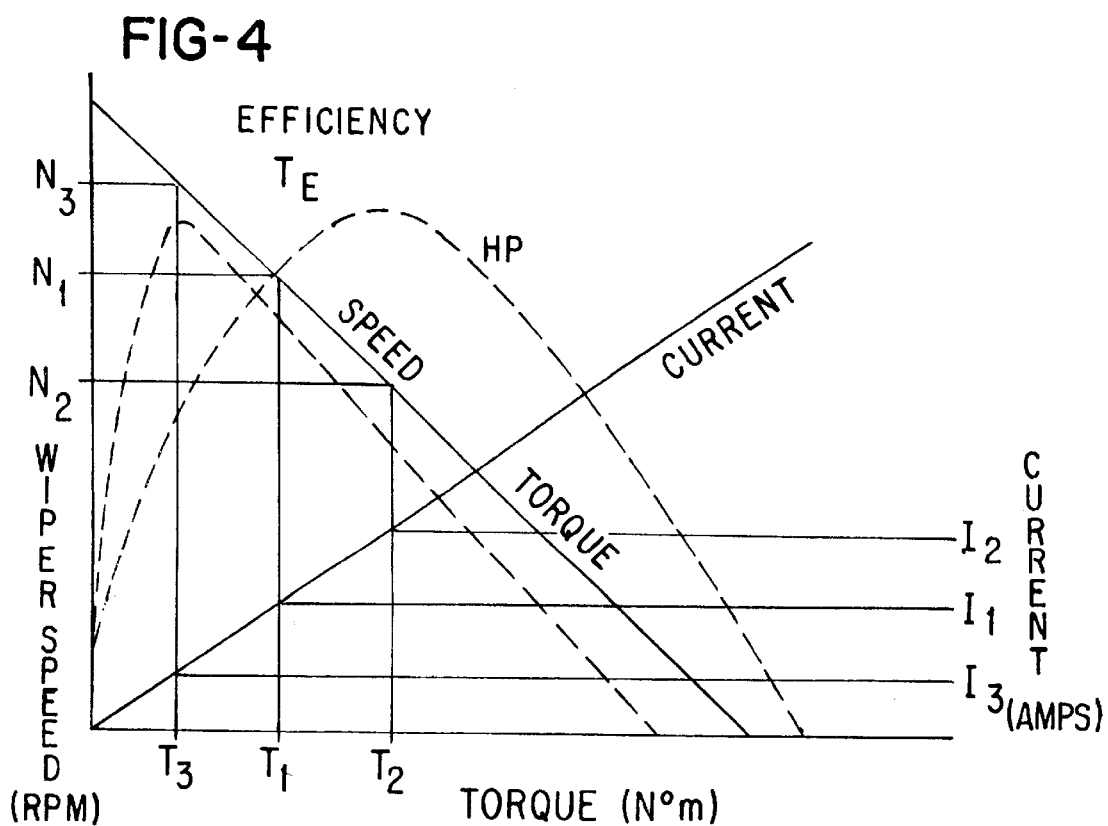

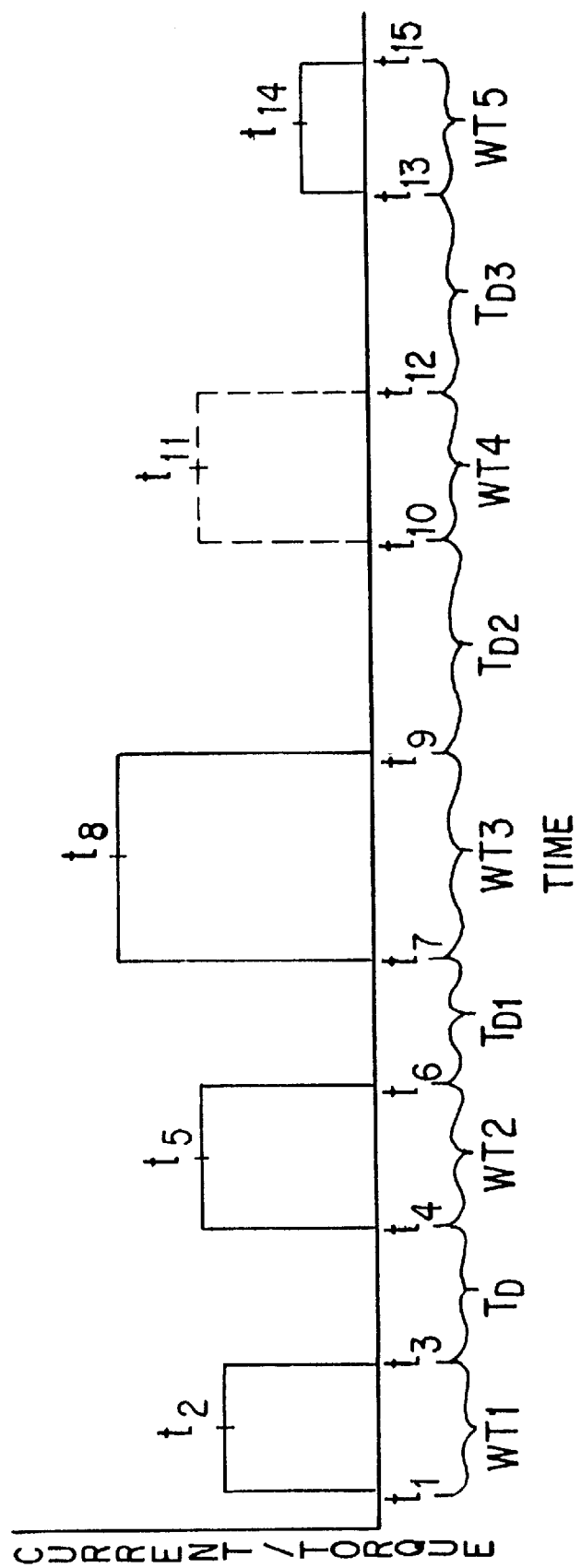

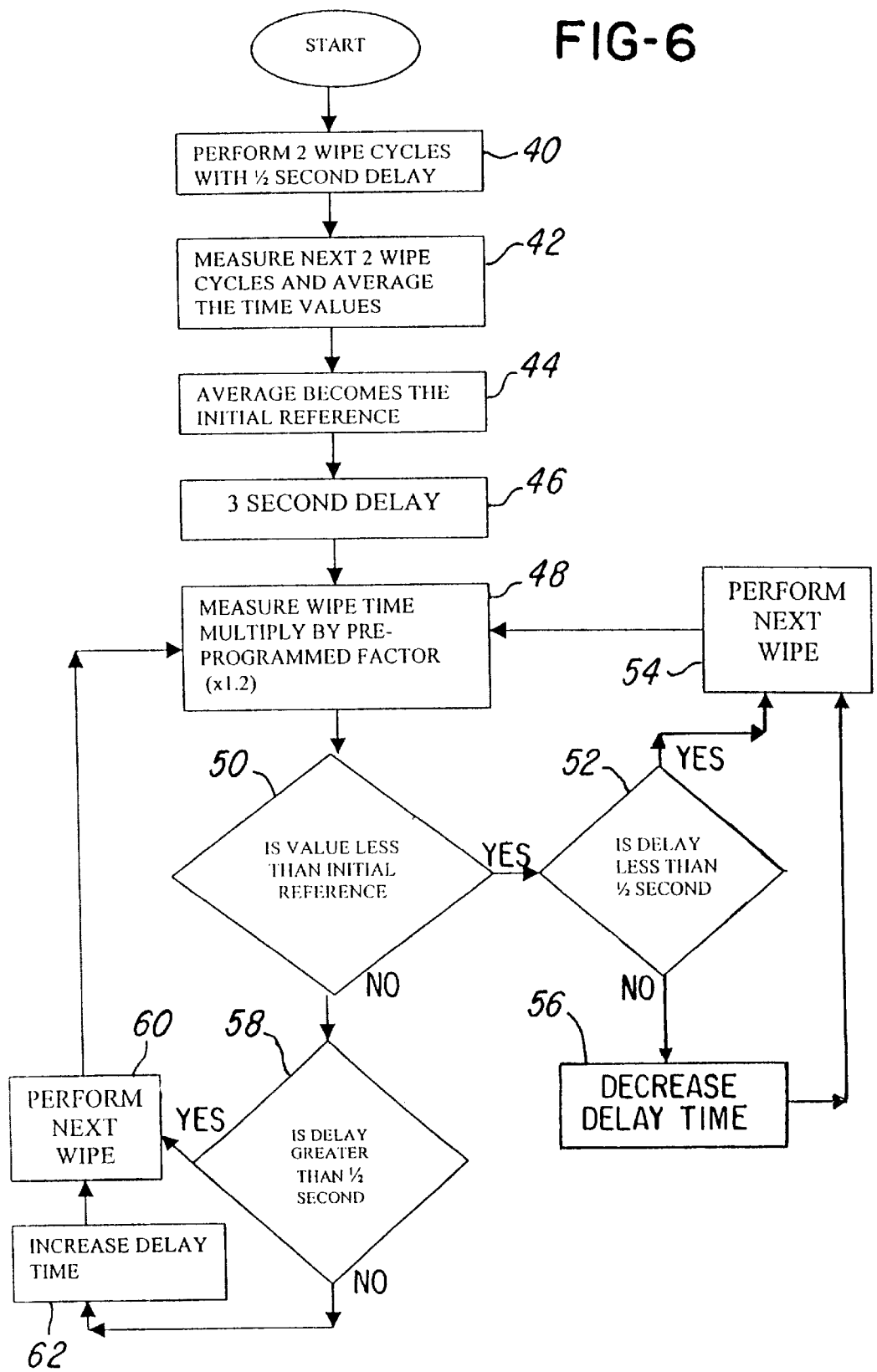

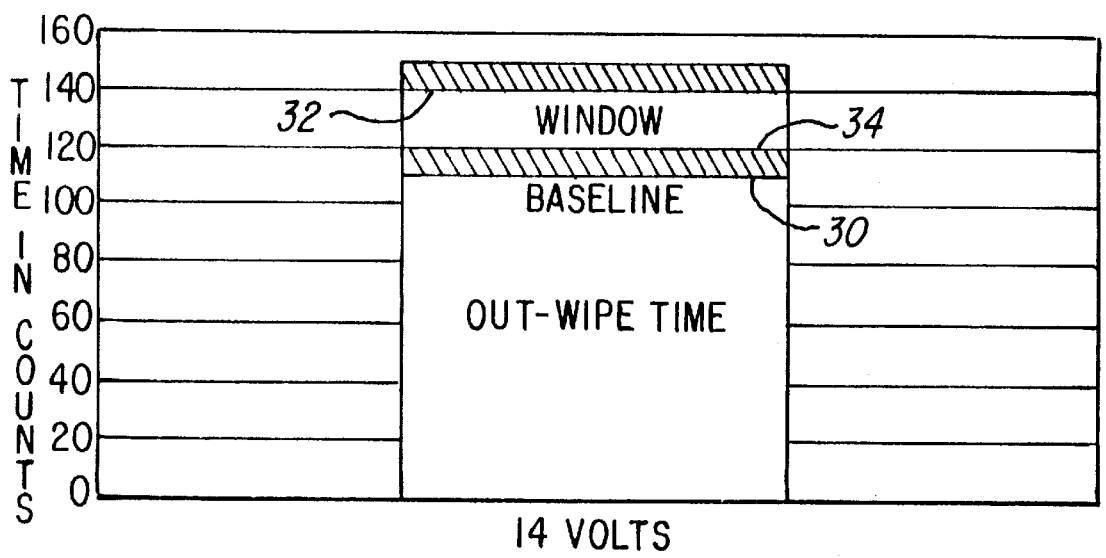

ADAPTIVE PULSE CONTROL

CROSS-REFERENCE TO RELATED APPLICATION

This application is related to provisional patent application Ser. No. 60/095,553 filed Aug. 6, 1998, to which Applicants claim the benefit of the earlier filing date.

BACKGROUND OF THE INVENTION

1. Field of the Invention

This invention relates to a windshield wiping system and method and, more particularly, an intelligent wiper system and method having an adaptive pulse control which automatically adjusts a delay time between consecutive wipes in response to a wipe cycle time.

2. Description of the Related Art

In the field of windshield wiper systems, various schemes and designs have been used to control the movement of wiper blades across a windshield. Various schemes control a pulse rate delivered to a windshield wiper motor which, in turn, controls the rate at which the windshield wiper blades wipe the windshield. Many of these schemes have used various types of sensing devices to sense the amount of rain or debris present on the windshield, and the wiper rate is adjusted in response to the amount of rain sensed. Such systems include adjusting the wiper speed in response to vehicle speed, wiper coast and optical, resistive, capacitive, inductive and visual (e.g., artificial intelligence with CCD camera and lenses) and the like.

A problem with the prior art system is that they required the use of components, such as sensors, to provide a sensed measurement of the amount of rainfall on the windshield. However, such devices and components have not provided an economical and effective means of controlling windshield wipers to optimize visibility and manual intervention by the driver has still been required.

What is needed, therefore, is an improved windshield wiper control system and method which is effective to automatically adjust a delay time between successive wipes of the wiper blades and dependence on the amount of moisture on the windshield.

SUMMARY OF THE INVENTION

It is, therefore, a primary object of the invention to provide an intelligent wiper system and method for wiping a windshield which utilizes a baseline delay time which may be adjusted in response to a comparison of a measured wipe time to a function of a first wipe time, wherein the function is at least one hundred percent of a first wipe time.

In one aspect this invention comprises a method for wiping a windshield comprising the steps of providing a wiper motor coupled to at least one wiper blade, providing a microprocessor coupled to the wiper motor for controlling the operation of the wiper motor, determining a first wipe time, setting a baseline delay time using the wipe time, the baseline delay time generally corresponding to a time interval between consecutive wipes of the wiper blade, determining a second wipe time, and adjusting the baseline delay time in response to the second wipe time if the second wipe time is not substantially the same as a function of the first wipe time.

In another aspect, this invention comprises an intelligent wiper system comprising at least one wiper blade, a wiper motor, linkage coupling at least one wiper blade to the wiper motor; a microprocessor coupled to the wiper motor for controlling the operation of the wiper motor, the microprocessor comprising a determiner for a determining a first wipe time and a second wipe time, a processor for determining a baseline delay time using the first wipe time and adjusting the baseline delay time in response to the second wipe time if the second wipe time is not substantially the same as a function of the first wipe time, the baseline delay time generally corresponding to a time interval between consecutive wipes of at least one wiper blade.

In another aspect, this invention comprises an intelligent wiper system comprising at least one wiper blade, a wiper motor, linkage coupling at least one wiper blade to the wiper motor, processor means for controlling the operation of the wiper motor, the processor means determining a first wipe time and a second wipe time and also determining a baseline delay time using the first wipe time and adjusting the baseline delay time in response to the second wipe time if the second wipe time is not substantially the same as a function of the first wipe time, the baseline delay time generally corresponding to a time interval between consecutive wipes of the wiper blade.

In still another aspect, this invention comprises a method of controlling a delay time between consecutive wipes of at least one wiper blade, comprising the steps of determining a wipe time threshold window, adjusting the delay time if a wipe time falls outside the wipe time threshold window, and the wipe time threshold window comprising an upper wipe time threshold and a lower wipe time threshold determined using at least one previous wipe time.

In still another aspect, this invention comprises the step of setting an upper baseline threshold and a lower baseline threshold using a first wipe time to establish a window of normal operation during which a delay time is not adjusted.

Another object of the invention is to provide a system and method which reduces or eliminates the need for sensors.

Other objects and advantages of the invention will be apparent from the following description, the accompanying drawings, and the appended claims.

BRIEF DESCRIPTION OF THE DRAWINGS

FIG. 1 is a schematic view of a system of the present invention;

FIG. 3 is a graphical view of a control range;

FIG. 4 is a graphical view of a relation of current and motor rpm to torque;

FIG. 5 is a timing diagram showing a relationship of torque and current to time;

FIG. 6 is a schematic diagram in accordance with one embodiment of the invention;

FIG. 8 is a threshold representation of an upper and lower threshold which may be established by a microprocessor in accordance with features of the invention.

DETAILED DESCRIPTION OF THE PREFERRED EMBODIMENT

Figure 2A:
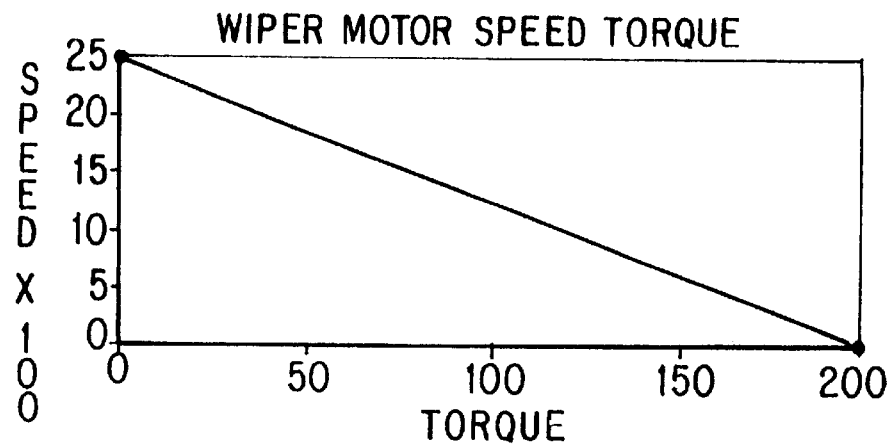
FIGS. 2A–2C are various charts showing various relationships of speed, torque and current.

Referring now to FIG. 1, a windshield wiping system 10 is shown comprising a wiper motor 12 coupled to a microprocessor 14 having an adaptive delay control or intelligent wiper system 16 described later herein. The wiper motor 12 is coupled to at least one wiper blade 18 and 20 with an armature and linkage 22. The motor 12 drives the armature and linkage 22 to drive the wiper blades 18 and 20 from an inwipe position (labeled "I.W." in FIG. 1) to an outwipe position (labeled "O.W." in FIG. 1) on windshield 24 in order to remove debris, such as dirt, dust, rain particles or the like therefrom.

Figure 2B:
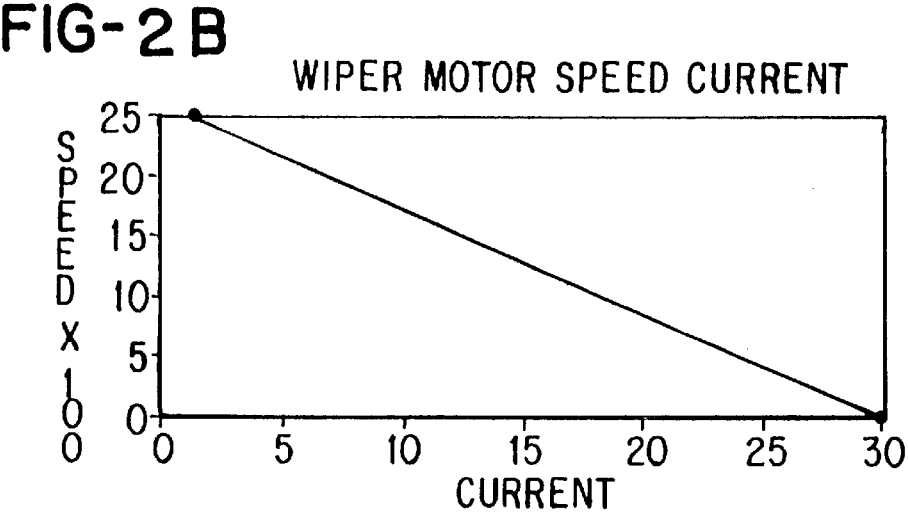
Figure 2C:
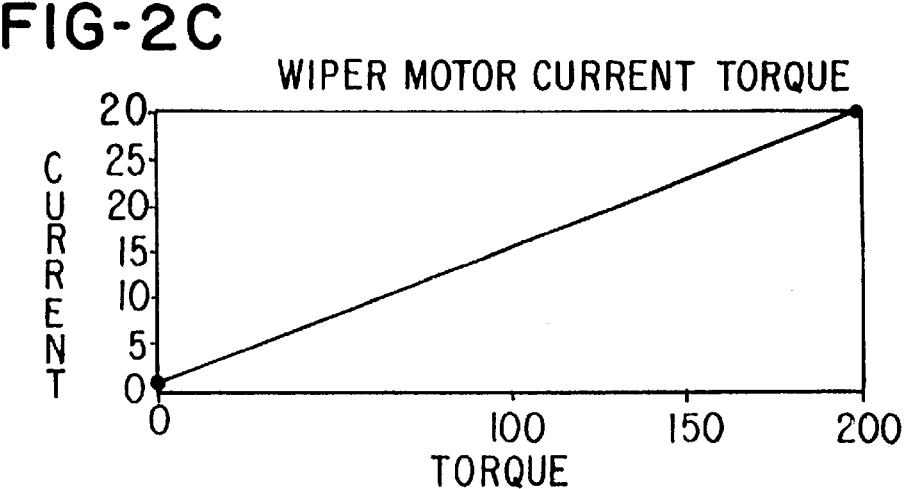

The system 10 utilizes knowledge of various relationships to control a pulse frequency (not shown) generated by microprocessor 14 for varying rates of rainfall, for example, at local temperature and humidity conditions. FIGS. 2A–2C illustrate the various relationships between wiper motor speed versus wiper motor torque (in newton meters, NM) and current (in amperes), as well as the relationship between the current to wiper motor 12 torque.

In general, it has been found that the wiper friction is inversely proportional to the amount of rainwater or wetness of the windshield 24 under particular conditions. Thus, as illustrated in FIG. 3, in heavy rains the torque experienced by wiper motor 12 is substantially lower because the increased rainfall on the windshield 24 decreases the amount of friction between the wiper blades 18 and 20 and the windshield 24. Conversely, with less rainfall or a light mist, the amount of torque experienced by the wiper motor 12 increases because the amount of friction between the wiper blades 18 and 20 and windshield 24 has increased.

FIG. 4 illustrates a relationship between torque and both wiper motor 12 rpm and current (amps) to wiper motor 12. In general, maximum efficiency is achieved where the wiper motor 12 rpm is the highest and torque is the lowest which is approximately at a time $T_E$. In one embodiment of the invention, it is desired to control a delay time between consecutive wipes of the wiper blades 18 and 20 so that the wipe time is approximately equal to the maximum efficiency time $T_E$.

To facilitate achieving the maximum efficiency time $T_E$, the invention controls a delay time $T_D$ between consecutive wipes of the at least one wiper blades 18 and 20. Thus, in a rain condition between a light mist and a light rain (as illustrated in FIG. 3) in the embodiment being described, the operator turns on a wiper switch (not shown) which, in turn, causes microprocessor 14 to set an initial time delay $T_D$ (FIG. 5) which represents the time between consecutive wipes. As the motor 12 runs at a torque T1, current I1 at speed N1 (FIG. 4), speed N1 causes the time interval $t_3-t_1$, as illustrated in FIG. 5, as WT1 between actuation (closing or opening) of an inner wiper switch 26 (FIG. 1) coupled to microprocessor 12. The switch 27 generates a signal whenever wiper blades 18 and 20 are moved into or out of, respectively, the inner wipe position. The signal is received by microprocessor 12 which determines a wipe time or count for an entire sweep which may be determined, for example, using a clock on the microprocessor 14.

In the illustration being shown in FIG. 5, t1, t4 and t7 correspond to the wiper blades 18 and 20 leaving the inner wipe position and times t3, t6 and t9, respectively, represent the time the blades 18 and 20 return to the inner wipe position after motor 12 drives the blades 18 and 20 to the outwipe position O.W. As illustrated in FIG. 5, time t2, t5 and t8, then, correspond to a wipe time about midway through each respective cycle required for wiper motor 12 to drive blades 18 and 20 from the inwipe position to the outwipe position. The time intervals WT1, WT2 and WT3 are the wipe times associated with the wipe times $t_3-t_1$, $t_6-t_4$ and $t_9-t_7$ respectively. It should be appreciated that the invention herein described may be used with a wipe time for less than an entire cycle. For example, the delay time $T_D$ may be adjusted in response to a wipe time $t_2-t_1$, which is the time required to drive the wiper blades 18 and 20 from the inwipe position to the outwipe position only (i.e., not including the wiper blades 18 and 20 from the outwipe position back to the inwipe position).

In the embodiment being described, if the rate of rainfall decreases, the motor torque t3, motor current I3 and the time interval, such as interval WT3, will be greater than earlier time intervals, such as intervals WT2 (t6–t4) or WT1 (t3–t1). The system automatically increases the subsequent delay time interval (t10–t9 or $T_{D1}$) which, in turn, increases the amount of delay time before the next wipe so that more rainwater will accumulate on the windshield 24 before the next wipe.

Conversely, as illustrated in FIG. 5, if the rain increases, then the time interval to perform a complete wipe should decrease because more rainwater and hence less friction is experienced by wiper blades 18 and 20. In this condition, the adaptive delay control 16 adjusts the delay time between wipes to be shorter so that the time between wipes is shorter.

In the embodiment being described and as illustrated in FIG. 3, the concept of the invention is preferably used when the rainfall is a light mist or light rain wherein a delay time is employed between consecutive wipes, as opposed to when the wiper is in a low speed or high speed mode or an operator actuated one wipe mode when an operator actuates the wiper blade switch for one wipe.

In one embodiment of the invention, the microprocessor 14 comprises the adaptive delay control 16 comprising a delay time control routine or means which will now be described relative to FIG. 6.

In the embodiment being described, the adaptive delay control 16 comprises a determinor for determining the first wipe time WT1 which, as mentioned earlier herein, represents the time associated with driving wiper blades 18 and 20 from an inwipe position at time t1 to an outwipe position (time $t_2$) and then back to an inwipe position at time t3. In general and as described later herein, the processor 14 determines an initial or baseline delay time using the first wipe time WT1 and adjusts the baseline delay time $T_D$ in response to a comparison of the second wipe time, such as time WT2 in FIG. 5, to the first wipe time WT1. If the second wipe time WT2 is not substantially the same as a function of a first wipe time, the base line delay time is adjusted in response thereto. In the embodiment being described herein, the function referred to is associated with a threshold representation, such as the threshold representation, shown in FIG. 8 and described later herein. The function represents an acceptable operating range before the baseline delay time is adjusted. In the embodiment being described, the function may be represented as follows:

WT1*K

Where WT1 is said first wipe time; and
K is a predetermined constant.

In one embodiment, the microprocessor 14 is programmed so that K is at least twenty percent of the first wipe time WT1 before the delay time $T_D$ is adjusted. The delay time between consecutive wipes of wiper blades 18 and 20 is then increased if the measured time, such as WT3 in FIG. 5, is greater than the time represented by the function. Conversely, the delay time between consecutive wipes is decreased if the measured wipe time, such as measured time in FIG. 5 is less than the value represented by the function.

It should be appreciated that, initially, the microprocessor 14 may be programmed with an initial base line delay time of at least three seconds so that when an operator uses a delay mode, the delay time between consecutive wipes is approximately three seconds. It should be understood, however, that this initial time may be increased or decreased as desired.

As shown in FIG. 8, another embodiment of the invention establishes a baseline time, which may be a time in counts, counted using, for example, a clock in microprocessor 14. The wiper system 10 sets a window or target time range by taking a base line wipe time, adding a predetermined value to it to establish an upper threshold value 32 and then subtracting a predetermined value from the upper threshold value 32 to establish a lower threshold value 34. The upper and lower wipe time threshold values 32 and 34 may then be used to compare subsequent wipe times for purposes of determining whether an adjustment to the delay time should be made. For example, as illustrated in FIG. 8, the adaptive delay control 16 may be programmed with a constant, such as 30 counts, which is added to a base line value such as 110 counts to establish the upper threshold 32 which, in the example being described, represents a count of 140. The control 16 in microprocessor 14 may then use either the same constant 30 or a different constant, such as a count of 20, which is subtracted from the upper threshold 32 to establish the lower threshold 34 of 120 counts. Thus, the upper and lower threshold values 32 and 34 of 120 and 140, respectively, establish a range so that if a measured wipe time falls within the range, no adjustment to the delay time $T_D$ between consecutive wipes is made.

If a wipe time falls above the upper threshold 32, thereby indicating that less rainwater is on the windshield, then the delay time is increased to increase the amount of time between consecutive wipes. If a wipe time falls below the lower threshold 34, then the delay time may be shortened so that less time appears between consecutive wipes.

It should be appreciated that the upper and lower threshold values 32 and 34 may be adjusted to account for changing conditions. For example, microprocessor 14 may be programmed such that if the processor 14 experiences a wipe time that is significantly below the lower threshold 34, then a consecutive number of times, such as 3 times, then the microprocessor 14 will reset the baseline which, in turn, will cause the upper and lower thresholds 32 and 34 to be adjusted in response to the reset base line time count. If the microprocessor 14 records a wipe time that is significantly above the upper threshold 32, the system may immediately set a long delay time or, alternatively, if a long delay time is already set, the microprocessor 14 may turn the motor 12 off altogether.

Initially, the initial baseline wipe time count may be determined from the count experienced during the first wipe cycle after the operator turns on the wiper switch (not shown). In the embodiment being described, the microprocessor 14 will reestablish a new base line whenever the operator turns on the wiper switch. It should be appreciated that microprocessor 14 is capable of a full range of dwell or delay time adjustments, ranging from a full run mode, during which the dwell or delay time is zero (or close to zero), to an off mode. The number of delays, as well as the range, may be set according to preference. For example, microprocessor 14 can be set to a short delay of 100 ms and triple this value every time the adaptive delay control signal 16 decides to increase the delay in the manner described earlier herein. In one embodiment, when the delay time becomes greater than 24 seconds, then the microprocessor 14 may turn the wiper motor 12 off completely in which case the wiper blades 18 and 20 may be driven from the inwipe position to a park position (not shown).

The adaptive delay control 16 may utilize one or both of the routines illustrated in FIGS. 6 and 7 which will now be described.

In FIG. 6, the routine begins at block 40 wherein microprocessor 14 energizes motor to drive wiper blades 18 and 20 to perform two wipe cycles with, for example, a one-half second delay between cycles. At block 42, the routine continues to measure the next two wipe cycles and average the time it took to perform the wipe cycles at block 42. At block 44, the average time becomes the initial base line or reference which microprocessor 14 uses to establish the lower and upper thresholds in the manner described earlier herein. At block 46, a microprocessor 14 may establish an initial delay between wipes at, for example, three seconds. It should be appreciated, however, that the initial delays and number of wipe cycles chosen in the routine may be varied as desired.

The routine continues to block 48 wherein a current wipe time is measured by microprocessor 14 and multiplied by a predetermined or pre-programmed factor, such as 1.2. The routine continues to decision block 50 wherein it is determined whether the factor value is less than an initial reference or less than the lower threshold mentioned earlier herein. If it is, then the routine continues to block 52 wherein it is determined whether the delay is less than one-half second. If it is, than the microprocessor 14 energizes motor 12 to perform the next wipe (block 54). If it is not, then adaptive delay control 16 causes the delay time between adjacent wipes to be decreased. Thus, it should be noted that at decision block 50 when it was determined that the value was less than an initial reference, microprocessor 14 and adaptive delay control 16 was able to determine that an excessive amount of rainwater was present on windshield 24.

If the decision at decision block 50 is negative, then the routine proceeds to block 58 wherein it is determined whether the delay is greater than one-half second. If it is, then microprocessor 14 energizes motor 12 to drive wiper blades 18 and 20 to perform the next wipe (block 60). If it is not, then the routine proceeds to block 62 wherein the delay time between wipes is increased by microprocessor 14.

In the embodiment being described, the delay thresholds established at decision blocks 52 and 58 may be increased or decreased as desired. Also, although not shown, it is envisioned that the microprocessor 14 may be programmed to cause the wiper blades 18 and 20 to switch to the next higher wipe setting if the decision at decision block 52 is affirmative. Likewise, microprocessor 14 may be programmed to switch to the next slower setting if the decision at decision block 58 is affirmative.

Figure 7:
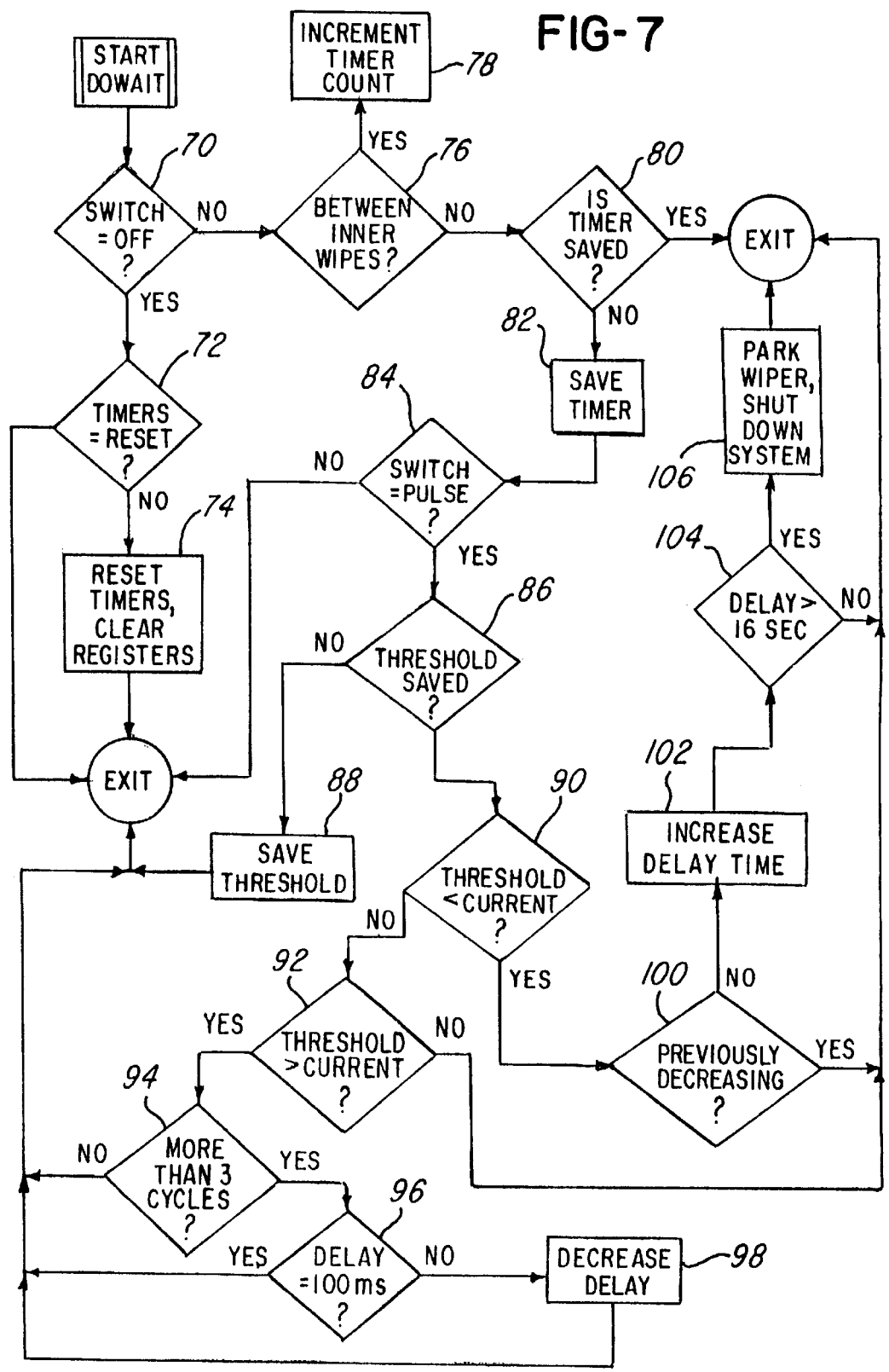
FIG. 7 is a schematic diagram in accordance with another embodiment of the invention.

FIG. 7 illustrates another embodiment of the adaptive control 16 utilized by microprocessor 14 which begins at decision block 70 wherein microprocessor 14 determines whether or not the windshield wiper switch is off. If it is, the routine proceeds to decision block 72 where it is determined whether the timers have been reset. If they have, then the routine exits as shown. If they have not, then microprocessor 14 resets the timers and clears all registers at block 74.

If the decision at decision block 70 is negative, then the routine proceeds to decision block 76 wherein it is determined if the system 10 is between inner wipes. If it is, then the routine increments a timer count within microprocessor 14 at block 78 and thereafter exits. If the decision at decision block 76 is negative, then the routine proceeds to decision block 80 wherein microprocessor 14 determines whether the timer is saved.

If it is saved, then the routine exits. If it is not, then microprocessor 14 saves the timer (block 82) and, thereafter, proceeds to decision block 84 where it is determined whether the switch is in a pulse operation mode during which, for example, a delay between wipes may be experienced. If it is not, then the routine exits. If it is, then it is determined at decision block 86 whether a threshold or wipe time is saved. If it is not, then microprocessor 14 saves the threshold at block 88 in suitable memory (not shown).

If the decision at decision block 86 is affirmative, then microprocessor 14 determines whether the threshold is less than a current measured wipe time associated with motor 12 (decision block 90). It should be appreciated that the current wipe time is directly related to the motor torque which is, in turn, related to the amount of rain on windshield 24. If the decision at decision block 90 is negative, then it is determined at decision block 92 whether the threshold is greater than the current measured wipe time. If it is, then the routine proceeds to decision block 94 where it is determined whether more than three cycles have occurred and if they have not, then the routine exits.

If the decision at decision block 94 is affirmative, then it is determined at decision block 96 whether the delay is equal to 100 ms, and if it is, then the routine proceeds to exit otherwise microprocessor 14 decreases the delay time at block 98. If the decision at decision block 90 is affirmative, then the routine proceeds to decision block 100 wherein microprocessor 14 determines whether there was a previously decreasing delay time $T_D$. If there was, then the routine exits otherwise, microprocessor 14 increases the delay time $T_D$ at block 102. Thereafter, the routine proceeds to decision block 104 wherein it is determined whether the delay is greater than a predetermined amount, such as, for example, 16 seconds. If it is, then microprocessor 14 may park the wiper blades 18 and 20 and/or shut wiper system down altogether (block 106).

Advantageously, this invention provides means, apparatus and method for delaying the delay time settings after an initial fixed setting to establish a base line performance. This makes the wiper system 10 adapt to varying conditions without requiring vehicle operated interface. The time duration per wipe cycle is measured by the microprocessor 14 and the time measurement directly and consistently corresponds to a torque value or an amount of load on the wiper blades 18 and 20 which, as mentioned earlier, corresponds to the amount of water on windshield 24. With this system 10, as water volume through the glass increases, the load is reduced, thereby reducing the torque of the motor 12 and microprocessor 14 decreasing the delay time between wipes. This means that a lower measured wipe cycle occurs as compared to a previous wipe cycle which the microprocessor 14 responds to by decreasing the delay time between wipes. As mentioned previously, as the torque level of the motor is increased, thereby indicating that an amount of rainwater is reduced, the motor 12 slows. The decreased wipe cycle time is the input which microprocessor 14 uses to increase the delay time between wipes.

Moreover, it should be appreciated that this system and method continuously adjusts as water to the glass is increased or decreased based upon the initial reference setting or base line. Because the initial setting is established each time the wiper is turned on, the system becomes independent of vehicle voltage, age of the performance of the wiper motor, rubber wiper blade element condition and age, wiper arm load and vehicle to vehicle system variations. This feature becomes very important as to achieve customer system satisfaction over the life of the vehicle over large volume of vehicles.

It should further be appreciated that with the system and method of the present invention no separate rain sensing devices, such as a capacitive sensor, optical sensor, inductive sensor, or other type of rainwater sensor need by utilized in that the system uses feedback from the motor torque to control the wiper system operation.

In the embodiment being described, the adjustment of the delay time may be performed using conventional fuzzy logic techniques, averaging of multiple wipe times (for example, the last two to four wipes) or using RMS averaging.

Advantageously, the wiper system 10 takes into account the effect of motor voltage and current on the wiper travel time. With the low motor voltage, the wiper system travels slower (thus taking longer) and has less acceleration across the windshield 24. This leads to a greater variation in wipe travel time due to other system variables which are negligible at normal motor voltages, but have a more pronounced effect when the motor voltage is low. To account for this, adaptive delay control 16 checks the wiper travel time associated with one or more wipes, as illustrated in the embodiment shown in FIGS. 6 and 7. The wipe time is then compared to a set value and if the wipe time count determined by microprocessor 14 is above the set threshold count or value, then the system sets a larger target window.

Another improved threshold adjustment will now be described. In the illustration shown in FIG. 8, if the wipe time is a count of 120 and the threshold window established by microprocessor 14 is initially set to a count of 20 for a motor running at a low voltage (e.g., under 11 volts), then for a normal wipe time measurement or count this window would remain unchanged. Assume, however, that the voltage is high, such as 300 in this illustration. Microprocessor 14 may then increase the target window to between 360 and 320, thereby increasing the threshold window range to 40, rather than 20. By increasing the relative size of the threshold window, the system 10 will count the larger variations and wipe times before adjusting any delay times. These variations are a result of other system variables such as blade wear, glass temperature and the like.

It should also be noted that the system according to the embodiments described herein will also automatically adjust for changes in rain volume, such as a result of vehicle speed. Also, the microprocessor 14 may be run in a diagnostic mode such that it can evaluate the wipe time which may then be compared to a range of wipe times indicating poor, acceptable and superior delay conditions. Microprocessor 14 then may then alarm an operator when the wiper blades are below acceptable operating conditions. Thus, it should be appreciated that the apparatus and method of the invention may be utilized as a diagnostic or maintenance tool to provide a user with an indication of when the wiper blades 18 and 20 need to be changed.

Although not shown, the system 10 may be used with a current sensing device that will enable the wiper system 10 to make a quicker and more accurate determination of wiper times. This current sensing system (not shown) can also be coupled with an outwipe sensor that determines when the system has reached the outwipe position (FIG. 1). Such sensors may provide more accurate feedback of the wipe time required to perform a wipe time. Also, having an outwipe position sensor would enable the system to respond and adjust quicker than a system which relies on an entire wipe cycle to obtain a wipe time for use as described herein.

While the methods herein described, and the forms of apparatus for carrying these methods into effect, constitute preferred embodiment of this invention, it is to be understood that the invention is not limited to these precise methods and forms of apparatus, and that changes may be made in either without departing from the scope of the invention, which is defined in the appended claims.

What is claimed is:

1. A method for wiping a windshield comprising the steps of:

providing a wiper motor coupled to at least one wiper blade;

providing a microprocessor coupled to said wiper motor for controlling the operation of said wiper motor;

determining an initial wipe time;

setting a baseline delay time using said wipe time, said baseline delay time generally corresponding to a time interval between consecutive wipes of said wiper blade;

determining a second wipe time; and adjusting said baseline delay time in response to said second wipe time if said second wipe time is not substantially the same as a function of said initial wipe time wherein said function is:

$$WT1*K$$

Where WT1 is said initial wipe time; and
K is a predetermined constant.

2. A method for wiping a windshield comprising the steps of:

providing a wiper motor coupled to at least one wiper blade;

providing a microprocessor coupled to said wiper motor for controlling the operation of said wiper motor;

determining an initial wipe time;

setting a baseline delay time using said wipe time, said baseline delay time generally corresponding to a time interval between consecutive wipes of said wiper blade;

determining a second wipe time; and adjusting said baseline delay time in response to said second wipe time if said second wipe time is not substantially the same as a function of said initial wipe time;

wherein said adjusting step further comprises the step of:

increasing said baseline delay time if said second wipe time is greater than said function.

3. A method for wiping a windshield comprising the steps of:

providing a wiper motor coupled to at least one wiper blade;

providing a microprocessor coupled to said wiper motor for controlling the operation of said wiper motor;

determining an initial wipe time;

setting a baseline delay time using said wipe time, said baseline delay time generally corresponding to a time interval between consecutive wipes of said wiper blade;

determining a second wipe time; and adjusting said baseline delay time in response to said second wipe time if said second wipe time is not substantially the same as a function of said initial wipe time;

wherein said adjusting step further comprises the step of:

decreasing said baseline delay time if said second wipe time is less than said function.

4. A method for wiping a windshield comprising the steps of:

providing a wiper motor coupled to at least one wiper blade;

providing a microprocessor coupled to said wiper motor for controlling the operation of said wiper motor;

determining an initial wipe time;

setting a baseline delay time using said wipe time, said baseline delay time generally corresponding to a time interval between consecutive wipes of said wiper blade;

determining a second wipe time; and adjusting said baseline delay time in response to said second wipe time if said second wipe time is not substantially the same as a function of said initial wipe time;

wherein said adjusting step further comprises the step of:

setting an upper wipe time baseline threshold and a lower wipe time baseline threshold using said initial wipe time;

performing said adjustment only if said second wipe time falls outside said upper and lower wipe time baseline thresholds.

5. A method for wiping a windshield comprising the steps of:

providing a wiper motor coupled to at least one wiper blade;

providing a microprocessor coupled to said wiper motor for controlling the operation of said wiper motor;

determining an initial wipe time;

setting a baseline delay time using said wipe time, said baseline delay time generally corresponding to a time interval between consecutive wipes of said wiper blade;

determining a second wipe time; and adjusting said baseline delay time in response to said second wipe time if said second wipe time is not substantially the same as a function of said initial wipe time;

wherein said adjusting step further comprises the step of:

setting an upper wipe time baseline threshold and a lower wipe time baseline threshold using said initial wipe time;

performing said adjustment only if said second wipe time falls outside said upper and lower wipe time baseline thresholds, wherein said setting step further comprises the step of:

adjusting said upper and lower wipe time baseline thresholds to be higher if three wipe time measurements are each greater than said function.

6. An intelligent wiper system comprising:

at least one wiper blade;

a wiper motor;

linkage coupling said at least one wiper blade to said wiper motor;

a microprocessor coupled to said wiper motor for controlling the operation of said wiper motor, said microprocessor comprising:

determinor for a determining a first wipe time and a second wipe time;

a processor for determining a baseline delay time using said first wipe time and adjusting said baseline delay time in response to said second wipe time if said second wipe time is not substantially the same as a function of said first wipe time, said baseline delay time generally corresponding to a time interval between consecutive wipes of said at least one wiper blade;

wherein said function is:

WT1*K

Where WT1 is said first wipe time; and
K is a predetermined constant.

7. An intelligent wiper system comprising:
at least one wiper blade;
a wiper motor;
linkage coupling said at least one wiper blade to said wiper motor;
a microprocessor coupled to said wiper motor for controlling the operation of said wiper motor, said microprocessor comprising:
determinor for a determining a first wipe time and a second wipe time;
a processor for determining a baseline delay time using said first wipe time and adjusting said baseline delay time in response to said second wipe time if said second wipe time is not substantially the same as a function of said first wipe time, said baseline delay time generally corresponding to a time interval between consecutive wipes of said at least one wiper blade;
wherein said microprocessor increases said baseline delay time if said second wipe time is greater than said function.

8. An intelligent wiper system comprising:
at least one wiper blade;
a wiper motor;
linkage coupling said at least one wiper blade to said wiper motor;
a microprocessor coupled to said wiper motor for controlling the operation of said wiper motor, said microprocessor comprising:
determiner for a determining a first wipe time and a second wipe time;
a processor for determining a baseline delay time using said first wipe time and adjusting said baseline delay time in response to said second wipe time if said second wipe time is not substantially the same as a function of said first wipe time, said baseline delay time generally corresponding to a time interval between consecutive wipes of said at least one wiper blade;
wherein said microprocessor decreases said baseline delay time if said second wipe time is less than said function.

9. An intelligent wiper system comprising:
at least one wiper blade;
a wiper motor;
linkage coupling said at least one wiper blade to said wiper motor;
a microprocessor coupled to said wiper motor for controlling the operation of said wiper motor, said microprocessor comprising:
determinor for a determining a first wipe time and a second wipe time;
a processor for determining a baseline delay time using said first wipe time and adjusting said baseline delay time in response to said second wipe time if said second wipe time is not substantially the same as a function of said first wipe time, said baseline delay time generally corresponding to a time interval between consecutive wipes of said at least one wiper blade;
wherein said microprocessor sets an upper wipe time baseline threshold and a lower wipe time baseline threshold using said first wipe time.

10. An intelligent wiper system comprising:
at least one wiper blade;
a wiper motor;
linkage coupling said at least one wiper blade to said wiper motor;
processor means for controlling the operation of said wiper motor, said processor means determining a first wipe time and a second wipe time and also determining a baseline delay time using said first wipe time and adjusting said baseline delay time in response to said second wipe time if said second wipe time is not substantially the same as a function of said first wipe time, said baseline delay time generally corresponding to a time interval between consecutive wipes of said at least one wiper blade;
wherein said function is:

WT1*K

Where WT1 is said first wipe time; and
K is a predetermined constant.

11. An intelligent wiper system comprising:
at least one wiper blade;
a wiper motor:
linkage coupling said at least one wiper blade to said wiper motor;
processor means for controlling the operation of said wiper motor, said processor means determining a first wipe time and a second wipe time and also determining a baseline delay time using said first wipe time and adjusting said baseline delay time in response to said second wipe time if said second wipe time is not substantially the same as a function of said first wipe time, said baseline delay time generally corresponding to a time interval between consecutive wipes of said at least one wiper blade;
wherein said processor means decreases said baseline delay time if said second wipe time is less than said function.

12. The method as recited in claim 1 wherein said method further comprises the step of:
programming said microprocessor so that K is at least 1.2.

13. The method as recited in claim 1 wherein said method further comprises the step of:
programming said microprocessor with an initial baseline delay time of at least 3 seconds.

14. The method as recited in claim 4 wherein said setting step comprises the step of:
resetting either said upper wipe time baseline threshold or said lower wipe time baseline threshold only after at least three wipe time measurements.

15. The method as recited in claim 4 wherein said setting step further comprises the step of:
adjusting said upper and lower wipe time baseline thresholds to be lower if each of said three wipe time measurements are lower than said function.

16. The intelligent wiper system as recited in claim 6 wherein said microprocessor is programmed so that K is at least 1.2.

17. The intelligent wiper system as recited in claim 6 wherein said microprocessor is programmed with an initial baseline display of at least 3 seconds.

18. The intelligent wiper system as recited in claim 9 wherein said microprocessor resets either said upper wipe time baseline threshold or said lower wipe time baseline threshold in response to at least three wipe time measurements.

19. The intelligent wiper system as recited in claim 18 wherein said microprocessor adjusts said upper and lower wipe time baseline thresholds to be higher if each of said at least three wipe time measurements are greater than said function.

20. The intelligent wiper system as recited in claim 18 wherein said microprocessor adjusts said upper and lower wipe time baseline thresholds to be lower if each of said three wipe time measurements are lower than said function.

21. The intelligent wiper system as recited in claim 10 wherein said processor means is programmed so that K is at least 1.2.

22. The intelligent wiper system as recited in claim 21 wherein said processor means increases said baseline delay time if said second wipe time is greater than said function.

23. The intelligent wiper system as recited in claim 10 wherein said processor means is programmed with an initial baseline display of at least 3 seconds.

24. The intelligent wiper system as recited in claim 21 wherein said processor means sets an upper wipe time baseline threshold and a lower wipe time baseline threshold using said first wipe time.

25. The intelligent wiper system as recited in claim 24 wherein said processor means resets either said upper wipe time baseline threshold or said lower wipe time baseline threshold in response to at least three wipe time measurements.

26. The intelligent wiper system as recited in claim 25 wherein said processor means adjusts said upper and lower wipe time baseline thresholds to be higher if each of said at least three wipe time measurements are greater than said function.

27. The intelligent wiper system as recited in claim 25 wherein said processor means adjusts said upper and lower wipe time baseline thresholds to be lower if each of said three wipe time measurements are lower than said function.

* * * * *